US009684819B2

United States Patent
Choi et al.

(10) Patent No.: US 9,684,819 B2
(45) Date of Patent: Jun. 20, 2017

(54) APPARATUS AND METHOD FOR DISTINGUISHING WHETHER AN IMAGE IS OF A LIVE OBJECT OR A COPY OF A PHOTO OR MOVING PICTURE

(71) Applicant: Samsung Electronics Co., Ltd., Gyeonggi-do (KR)

(72) Inventors: Daniel Choi, Gyeonggi-do (KR); Suk-Soon Kim, Gyeonggi-do (KR); Bo-Ram Namgoong, Seoul (KR); Mi-Sun Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/725,225

(22) Filed: May 29, 2015

(65) Prior Publication Data

US 2015/0261997 A1   Sep. 17, 2015

Related U.S. Application Data

(63) Continuation of application No. 13/871,099, filed on Apr. 26, 2013, now Pat. No. 9,049,379.

(30) Foreign Application Priority Data

Apr. 26, 2012   (KR) .................. 10-2012-0043971

(51) Int. Cl.
*H04N 5/228* (2006.01)
*G06K 9/00* (2006.01)
*H04N 5/232* (2006.01)

(52) U.S. Cl.
CPC ..... *G06K 9/00275* (2013.01); *G06K 9/00288* (2013.01); *G06K 9/00899* (2013.01); *H04N 5/23219* (2013.01); *H04N 5/23296* (2013.01)

(58) Field of Classification Search
CPC .................................................. H04N 21/4415
See application file for complete search history.

(56) References Cited

U.S. PATENT DOCUMENTS 7,508,960 B1   3/2009   Bolle et al.
8,437,513 B1*  5/2013   Derakhshani ...... G06K 9/00597
                                                          382/115
(Continued)

FOREIGN PATENT DOCUMENTS

CN   101611625 A   12/2009
CN   101854522 A   10/2010
(Continued)

OTHER PUBLICATIONS

European Search Report, dated Apr. 18, 2017.
Chinese Search Report, Dated: Apr. 28, 2017.

*Primary Examiner* — Gary C Vieaux
(74) *Attorney, Agent, or Firm* — Cha & Reiter, LLC

(57) ABSTRACT

A method for recognizing an image in an electronic device is provided so as to determine whether or not a specific object is actually within the presence of (immediate photographable vicinity) of the electronic device based on certain characteristics of one or more images of the specific object. Images of the specific object which is focused and shot at different magnifications are obtained. Characteristics of an object region and a background region between the obtained images are compared. Whether the object is real is determined depending on the comparison result. An apparatus hardware configured for operation of the method in electronic devices including but limited to mobile terminals.

19 Claims, 13 Drawing Sheets

(56) References Cited

U.S. PATENT DOCUMENTS

| | | | |
|---|---|---|---|
| 8,542,879 B1* | 9/2013 | Nechyba | G06K 9/00228 |
| | | | 382/103 |
| 8,848,986 B2 | 9/2014 | Cavallini | |
| 8,856,541 B1 | 10/2014 | Chaudhury et al. | |
| 9,245,173 B2* | 1/2016 | Lee | G06K 9/00597 |
| 2003/0169901 A1* | 9/2003 | Pavlidis | G06K 9/00228 |
| | | | 382/103 |
| 2004/0112962 A1* | 6/2004 | Farrall | G06K 7/12 |
| | | | 235/462.01 |
| 2006/0110015 A1 | 5/2006 | Rowe | |
| 2007/0253604 A1* | 11/2007 | Inoue | G06K 9/00221 |
| | | | 382/118 |
| 2008/0059807 A1* | 3/2008 | Miller, Jr. | G06K 9/00885 |
| | | | 713/186 |
| 2010/0158319 A1 | 6/2010 | Jung et al. | |
| 2010/0277596 A1 | 11/2010 | Nakamura et al. | |
| 2011/0007949 A1 | 1/2011 | Hanna et al. | |
| 2011/0164792 A1 | 7/2011 | Yoon et al. | |
| 2011/0188712 A1 | 8/2011 | Yoo et al. | |
| 2011/0299741 A1 | 12/2011 | Zhang et al. | |
| 2012/0050561 A1 | 3/2012 | Kitajima | |
| 2012/0075452 A1 | 3/2012 | Ferren | |
| 2012/0123786 A1* | 5/2012 | Valin | G06Q 20/105 |
| | | | 704/273 |
| 2015/0016692 A1 | 1/2015 | Hanna et al. | |

FOREIGN PATENT DOCUMENTS

| | | |
|---|---|---|
| CN | 101908140 A | 12/2010 |
| CN | 201698194 U | 1/2011 |
| CN | 102014271 A | 4/2011 |
| CN | 102169609 A | 8/2011 |
| CN | 102201061 A | 9/2011 |
| CN | 201965677 U | 9/2011 |
| CN | 202197300 U | 4/2012 |
| EP | 1 703 440 A2 | 9/2006 |
| EP | 1 835 440 A2 | 9/2007 |
| EP | 2 426 909 A1 | 3/2012 |
| KR | 10-2008-0037447 A | 4/2008 |
| KR | 10-2010-0057984 A | 6/2010 |
| KR | 10-2010-0073191 A | 7/2010 |
| KR | 10-2010-0125985 A | 12/2010 |
| KR | 10-2011-0080327 A | 7/2011 |

* cited by examiner

APPARATUS AND METHOD FOR DISTINGUISHING WHETHER AN IMAGE IS OF A LIVE OBJECT OR A COPY OF A PHOTO OR MOVING PICTURE

CLAIM OF PRIORITY AND CROSS REFERENCE TO RELATED APPLICATIONS

This application is a continuation of U.S. patent application Ser. No. 13/871,099 filed Apr. 26, 2013, now U.S. Pat. No. 9,049,379, which claims the benefit of 35 U.S.C.§119 (a) from a Korean patent application filed in the Korean Intellectual Property Office on Apr. 26, 2012 and assigned Serial No. 10-2012-0043971, the entire disclosure of which is hereby incorporated by reference in its entirety.

BACKGROUND

1. Field of the Invention

The present invention relates to an apparatus and a method for recognizing an image.

2. Description of the Related Art

Nowadays, an electronic device, particularly, a portable electronic device has been developed to have various functions to meet user's desires. For example, a mobile communication terminal provides functions far beyond voice communication, and, for example, allows a user to listen to various music using an MP3 sound source into basic communication functions such as texting with a counterpart user, and also allows the user to enjoy web surfing using a wireless Internet, download various programs using the wireless Internet, and use the same. Also, the mobile communication terminal has at least one mega-pixel image pick-up device (camera lens assembly) to allow the user to capture the image of a desired specific object. More recently, portable terminals permit both recording and viewing a moving picture as well as a still image, more particularly, 3-dimensional image photographing function is generally distributed.

Recently, as a ubiquitous environment is being created for the electronic devices such as mobile communication terminals, a technology that can recognize a photo (image) of a specific object is widely developed. More particularly, among these object recognitions, face recognition is now being applied as one field of a plurality of living body recognitions. Face recognition by the electronic device denotes an operation for recognizing facial features by analyzing a symmetrical structure, an appearance of a face, hair, eye color, movement of a facial muscle, etc. Applications of face recognition can vary to a large degree.

For example, the face recognition may be used for identification purposes in order to replace a passport, a credit card, etc., and may be used for security purposes such as time and attendance management, gate pass, password replacement, etc. Also, face recognition may be utilized for public safety purposes such as a suspected criminal search, crime-ridden district monitoring, etc. Furthermore, face recognition is applied even to a smart phone application for amusement that can find a similar figure resembling a user himself. Therefore, the face recognition function is convenient in that a user does not need to remember or possess a something separately, such as a credit card or identification card, or card key, or some type of access code. Face recognition may also comprise only recognition of a portion of a person's face.

However, an electronic device in general typically captures the image of a face in a two-dimensional image and performs face recognition using the captured image. The captured image is not a real face but a face identified in the picture/moving picture, but the face recognition is applied to the captured image. This aspect of face recognition causes vulnerability for security purposes.

For example, in the case where a user encrypts and uses recognition information regarding a specific face as an object, the user may decipher a code by only capturing a picture of a relevant person, not a face that is being actually photographed. In other words, conventional face recognition systems are vulnerable to someone positioning, for example, a high-definition image of somebody else in front of a camera to fool the system into providing access to bank records, to make credit purchases, or whatever systems are using face recognition rather than passwords, identification cards, etc.

SUMMARY

An exemplary aspect of the present invention is to address at least some of the above-mentioned problems and/or disadvantages and to provide at least the advantages described below. Accordingly, an exemplary aspect of the present invention provides a method and an apparatus for recognizing an image, for improving recognition security of a specific object.

Another exemplary aspect of the present invention provides a method and an apparatus for recognizing an image, and for identifying whether an object that is being captured by a camera is an actual object or an object in a picture/moving picture (i.e. taking a picture of a picture).

Still another exemplary aspect of the present invention provides a method and an apparatus for recognizing an image, for identifying whether a person that is being photographed by a camera is an actual person, or a person whose image has been captured from a picture/moving picture.

Yet another exemplary aspect of the present invention is to provide a method and an apparatus for recognizing a person, for selectively applying person recognition to an image obtained by photographing an actual object, and not applying person recognition to a photograph of an object in a picture/moving picture (i.e. taking a photo of a picture/moving picture).

In accordance with an exemplary aspect of the present invention, a method for recognizing an image in an electronic device is provided. The method may include obtaining by a processing unit images of a specific object which is focused and shot at different magnifications by a camera subsystem, comparing by the processing unit in conjunction with a camera module characteristics of an object region and a background region between the obtained images, and determining by the processing unit whether the specific object is physically within the presence of the camera subsystem and is not a copy or photo of the specific object depending on the comparison result.

In accordance with another exemplary aspect of the present invention, an electronic device for recognizing an image is provided. The device may include at least one processor configured for image recognition of a specific object, a camera system coupled to the processor, a memory, and at least one module stored in the memory comprising machine executable code that configured for execution of an image recognition application by the at least one processor, wherein the at least one processor configured by the at least one module obtains images of the specific object which are focused and respectively shot at different magnifications from the camera system, compares characteristics of an object region and a background region between the obtained images, and determines whether the specific object is physically within the presence of the camera subsystem and is not a copy or photo of the specific object depending on the comparison result.

Other exemplary aspects, advantages and salient features of the present invention will become apparent to those persons of ordinary skill in the art from the following detailed description, which, taken in conjunction with the annexed drawings, discloses exemplary embodiments of the invention.

BRIEF DESCRIPTION OF THE DRAWINGS

The above and other exemplary aspects, features and advantages of certain exemplary embodiments of the present invention will become more apparent to the artisan from the following description taken in conjunction with the accompanying drawings in which.

Throughout the drawings, like reference numerals will be understood to refer to like parts, components and structures.

DETAILED DESCRIPTION

The following description with reference to the accompanying drawings is provided to assist a person of ordinary skill in the art with a comprehensive understanding of exemplary embodiments of the invention as defined by the claims and their equivalents. The description includes various specific details to assist in that understanding but these are to be regarded as merely exemplary. Accordingly, those of ordinary skill in the art will recognize that various changes and modifications of the exemplary embodiments described herein can be made without departing from the scope and spirit of the invention as defined by the appended claims. Also, descriptions of well-known functions and constructions may be omitted for clarity and conciseness when their inclusion could obscure appreciation of the invention by a person of ordinary skill in the art with such well-known functions and constructions.

The terms and words used in the following description and claims are not limited to their bibliographical meanings, but, are merely used by the inventor to enable a clear and consistent understanding of the invention. Accordingly, it should be apparent to those skilled in the art that the following description of exemplary embodiments of the present invention are provided for illustration purposes only and not for the purpose of limiting the invention as defined by the appended claims and their equivalents.

In describing the present invention, a mobile communication terminal is illustrated and a method and an apparatus for recognizing a face using the mobile communication terminal are described. However, the present invention is not limited thereto. For example, the present invention is applicable to various electronic devices including at least one camera lens assembly (image pick-up device) for photographing an object. Furthermore, though the present invention describes face recognition of a person in a shot image, a person of ordinary skill in the art should appreciate that the present invention is applicable to recognition of various objects such as a thing, an animal, etc., as well as a person.

Exemplary embodiments of the present invention provide a method and an apparatus for recognizing an image (a live image rather than a picture of a picture), for improving security in recognition of a person. An exemplary embodiment of the present invention identifies whether a person who is being shot by a camera is an actual person or a person in a picture/moving picture, and applies person recognition to an image obtained by shooting an actual person. The present invention advantageously overcomes at least one vulnerability of conventional facial recognition systems, namely that one could arrange a high quality photograph of another person in front of the camera module and fool the facial recognition system into permitting access to financial records, make purchases with linked credit and debit cards, etc.

Figure 1:
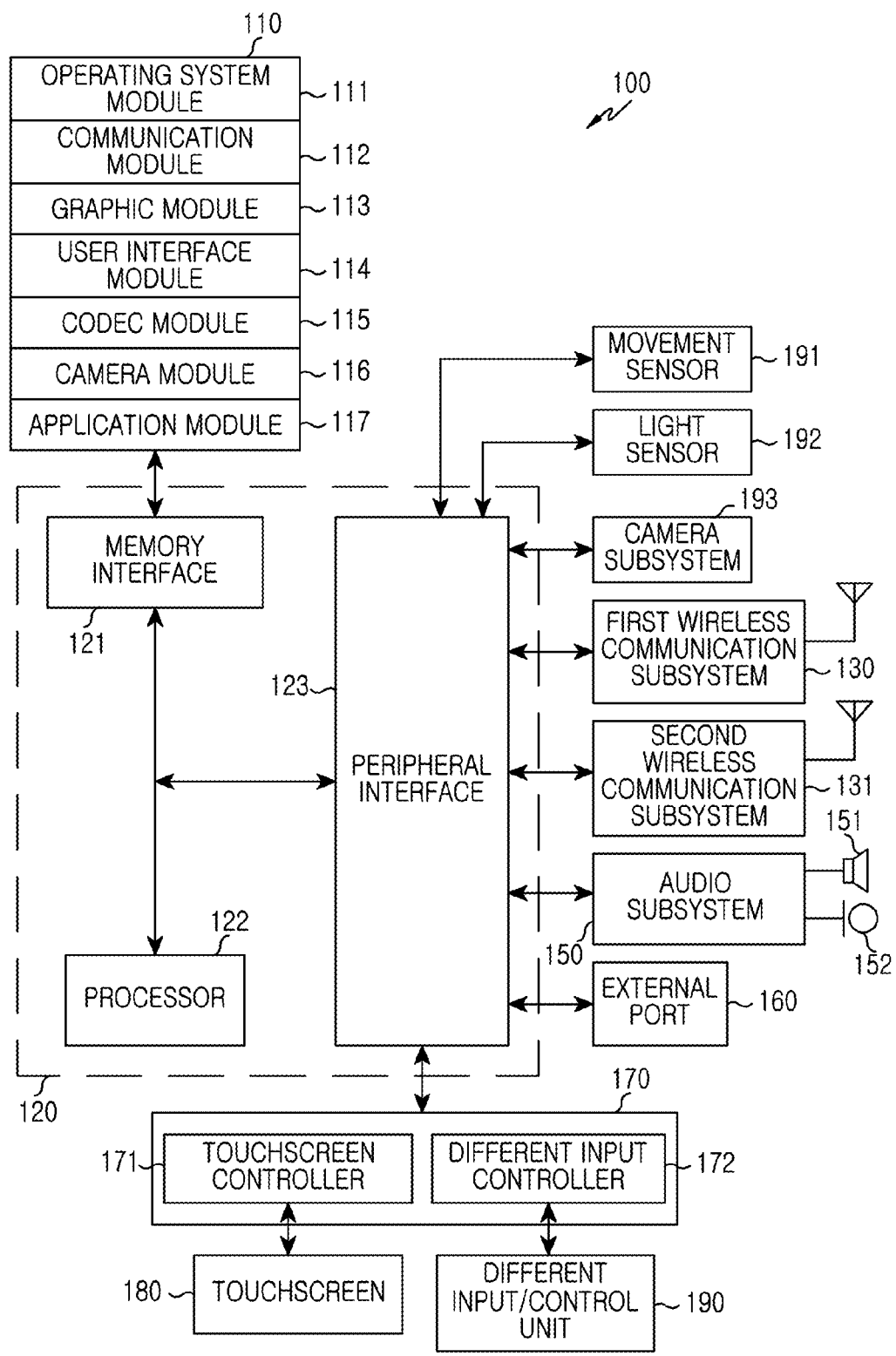
FIG. 1 is a block diagram illustrating an electronic device according to an exemplary embodiment of the present invention.

FIG. 1 is a block diagram illustrating an electronic device according to an exemplary embodiment of the present invention. The electronic device 100 may be a portable electronic device, and may comprise a device such as a portable terminal, a mobile phone, a mobile pad, a media player, a tablet computer, a handheld computer, and a Personal Digital Assistant (PDA). Also, the electronic device may be an arbitrary electronic device including a device coupling two or more functions among these devices. It is also possible that the device could be, for example, device used as part of a payment system, such as for credits card, debits, or checks, or even a vending machine, where someone could try to use an image of someone else either to obtain access to personal information or make fraudulent use of someone else's image to use their credit account, etc.

The electronic device 100 includes a memory 110, a processor unit 120, a first wireless communication subsystem 130, a second wireless communication subsystem 131, an external port 160, an audio subsystem 150, a speaker 151, a microphone 152, an Input/Output subsystem (I/O system) 170, a touch screen 180, and a different input/control unit 190. A plurality of memories 110 and external ports 160 may be configured.

The processor unit 120 includes hardware such as a processor 122 or microprocessor, a memory interface 121, one or more processors 122, and a peripheral interface 123. The entire processor unit 120 may be also called a controller or control unit, or processor. The memory interface 121, the one or more processors 122 and/or the peripheral interface 123 may be separate elements or may be integrated in one or more integrated circuits.

The processor 122 executes various machine executable codes in order to perform various functions for the electronic device 100. In addition, the processor 122 performs processes and controls for voice communication, video communication, and data communication. In addition to these general functions, the processor 122 executes a specific software module (instruction set) stored in the memory 110 that is loaded into the processor to configure the processor to perform various specific functions corresponding to the relevant module. In other words, the processor 122 performs a method of an exemplary embodiment of the present invention in cooperation with software modules stored in the memory 110. The memory is a non-transitory memory.

The processor 122 may include one or more data processors, image processors, and/or a CODEC. The electronic device 100 may also include the data processors, the image processors, or the CODEC separately. The peripheral interface 123 connects the I/O subsystem 170 of the electronic device 100 and various peripheral devices to the processor 122. Furthermore, the peripheral interface 123 connects the I/O subsystem 170 of the electronic device 100 and various peripheral devices to the memory 110 via the memory interface 121.

Particularly, according to the present invention, the processor 122 controls a camera module 116 for recognizing an object. The camera module 116 is described below in more detail. Various elements of the electronic device 100 may be coupled via one or more communication buses (reference numeral not shown) or stream lines (reference numeral not shown).

The external port 160 is used for directly connecting the electronic device 100 to other electronic devices or indirectly connecting the electronic device 100 to other electronic devices via a network (for example, the Internet, an Intranet, a wireless LAN, etc.) For example, the external port 160 may be a Universal Serial Bus (USB) or a FIREWIRE port, etc. but is not limited thereto.

A movement (motion) sensor 191 and a light sensor 192 may be coupled to the peripheral interface 123 to enable various functions. For example, the movement sensor 191 and the light sensor 192 may be coupled to the peripheral interface 123 to detect movement of the electronic device 100 or detect external light.

A camera subsystem 193 may perform a camera function such as a take a picture, a video clip recording, etc. The light sensor 192 may be a Charged Coupled Device (CCD) or a Complementary Metal Oxide Semiconductor (CMOS) device for the camera subsystem 193.

More particularly, according to an exemplary embodiment of the present invention, the camera subsystem 193 can change the hardware configuration, for example, by controlling the lens movement, F-number of an aperture, etc. depending on the camera module 116 executed by the processor 122.

The first and second wireless communication subsystems 130 and 131 enable communication. The first and second wireless communication subsystems 130 and 131 may include a Radio Frequency (RF) receiver and an RF transceiver and/or a light (for example, infrared) receiver and a light transceiver. While an antenna is shown for each, the artisan understands the claimed invention can include multiple antennas, such as an antenna array, or MIMO system. The first and second wireless communication subsystems 130 and 131 may be classified depending on a communication network. For example, the first and second wireless communication subsystems 130 and 131 may be designed to operate via one of a Global System for Mobile Communication (GSM) network, an Enhanced Data GSM Environment (EDGE) network, a Code Division Multiple Access (CDMA) network, a Wide-CDMA (W-CDMA) network, a Long Term Evolution (LTE) network, an Orthogonal Frequency Division Multiple Access (OFDMA) network, a Wireless Fidelity (Wi-Fi) network, a WiMax network, and/or a Bluetooth network, just to name some possible non-limiting examples.

The audio subsystem 150 may be coupled to a speaker 151 and a microphone 152 to take charge of voice recognition, voice duplication, digital recording, and input/output of an audio such a communication function. In other words, the audio subsystem 150 communicates with a user via the speaker 151 and the microphone 152. The audio subsystem 150 receives a data signal via the peripheral interface 123 of the processor unit 120, converts the received data signal to an electric signal, and provides the converted electric signal to the speaker 151. The speaker 151 converts the electric signal to a signal in an audible frequency band and outputs the same. The microphone 152 converts a sound wave transferred from a person or other sound sources to an electric signal. The audio subsystem 150 receives the electric signal from the microphone 152, converts the received electric signal to an audio data signal, and transmits the converted audio data signal to the peripheral interface 123. The audio subsystem 150 may include, for example, an attachable and detachable ear phone, a head phone, or a headset.

The I/O subsystem 170 may include a touchscreen controller 171 and/or a different input controller 172. The touchscreen 180 allows at least one transformation of stretching, shrinking, warping, folding, twisting, bending, and unfolding. The touchscreen controller 171 is coupled to the touchscreen 180 and controls an image output depending on transformation of the touchscreen 180. The touchscreen 180 and the touchscreen controller 171 may further apply an arbitrary multi-touch detection technology including other proximity sensor arrangements or other elements as well as capacitive, resistive, infrared, and surface acoustic wave technologies. The different input controller 172 is a controller, for example, for an input other than the touchscreen 180, and the different input controller 172 may be coupled to a different input/control unit 190. The different input/control unit 190 may include an up/down button for volume control. Besides, the different input/control unit 190 may include at least one of a push button, a rocker button, a rocker switch, a thumb-wheel, a dial, a stick, and/or a pointer device such as a stylus, etc. that provides a relevant function.

With continued reference to FIG. 1, the touchscreen 180 provides an input/output interface between the electronic device 100 and a user. For example, the touchscreen 180 applies the touch detection technology, transfers the user's touch input to the electronic device 100, and shows visual information (for example, text, graphics, video, etc.) provided from the electronic device 100 to the user.

The memory 110 is connected to the memory interface 121. The memory 110 includes a high speed random access memory such as one or more magnetic disc storage devices and/or a non-volatile memory, one or more optical storage devices and/or a flash memory (for example, NAND, NOR).

The memory 110 stores machine executable code. For example, machine executable code includes an operating system module 111, a communication module 112, a graphic module 113, a user interface module 114, a CODEC module

115, a camera module 116, one or more application modules 117, etc. A terminology of a module may be expressed as a set of instructions or an instruction set or a program, that are loaded into hardware such as processors, microprocessor, or subprocessors that are configured to function according to the respective module.

The operation system 111 denotes a built-in operating system such as WINDOWS, LINUX, Darwin, RTXC, UNIX, OS X, or VxWorks, and includes various software elements for controlling a general system operation. This control of the general system operation includes memory management and control, storage hardware (device) control and management, power control and management, etc. Furthermore, this operating system software performs a function for smoothing communication between various hardwares (devices) and software elements (modules).

The communication module 112 can provide communication with counterpart electronic devices such as a computer, a server and/or a portable terminal, etc. via the wireless communication subsystems 130, 131 or the external port 160.

The graphic module 113 includes various software elements comprising machine executable code for providing and displaying graphics on the touchscreen 180. A terminology of graphics denotes text, a web page, an icon, a digital image, a video, animation, etc. There may be a dedicated graphic processor or subprocessor.

The user interface module 114 includes various software elements comprising machine executable code related to a user interface. Furthermore, the user interface module 114 includes content as to how the state of the user interface is changed and under what condition a change of a user interface state is performed, etc.

The CODEC module 115 includes a software element comprising machine executable code related to encoding and decoding of a video file.

The camera module 116 includes a camera-related software element comprising machine executable code for enabling camera-related processes and functions. Furthermore, according to an embodiment of the present invention, the camera module 116 may identify whether a specific object in a shot image is an actual object or an object in a picture/moving picture. More preferably, the camera module 116 may identify whether or a person in a captured image taken for application to person recognition is an actual image of the person taken in front of the camera (i.e. "in the presence of", "in the immediate vicinity") or a person in a picture/moving picture (a picture of a picture, or arranging a picture of a person in front of the camera to fool the recognition system into determining someone permitted their image to be fraudulently used). For example, the camera module 116 may obtain a plurality of magnification-controlled images while focusing on a specific object, and identify whether the object is an actual object or an object in a picture/moving picture based on the obtained images. More preferably, the camera module 116 may obtain a plurality of magnification-controlled images while focusing on a specific person in the image, and identify whether or not the image of the person is an actual person in front of the camera or an image of a person in a picture/moving picture based on the obtained images. The camera module 116 may operate in conjunction with its own microprocessor or subprocessor coupled to the processor that is configured for operation, or processor 122 may be loaded with (configured) for operation by the machine executable code of the camera module.

Hereinafter, though recognition of a specific person in an image shot by the camera module 116 is described, a person of ordinary skill in the art should appreciate that the specific person may be replaced by various objects such as a thing, an animal, etc.

The camera module 116 may identify whether or not an image of a person is an actual person in front of the camera or a person in a picture/moving picture in following three ways.

First, the camera module 116 extracts "person regions" and "background regions" from the images shot at the plurality of magnifications, and identifies whether a contrast difference exists between the extracted person regions and the extracted background regions. In the case where the contrast difference does not exist between the extracted person regions and background regions, the camera module 116 determines that the shot person is a person in a picture/moving picture. One reason is that an actual image of a person in the person region and the actual image of the background in the background region is that in the case of a live person the foreground and background is three dimensional, that is captured and shown as a two dimensional image in a picture. Therefore, items in the background of a live person would have a different contrast than photo of a photo (putting a photo in front of a camera, for example), as the photo is two dimensional, and the image of the two dimensional photo, if placed in front of a camera module, for example, would not have the different contrast between foreground and background. In contrast, in the case where the contrast difference exists between the extracted person regions and background regions, the camera module 116 determines that the shot person is an actual person.

Second, the camera module 116 identifies whether or not a unique border line (outline) of only a picture/moving picture is detected from at least one of the images shot at the plurality of magnifications. Therefore, in the case where the border line (outline) of a picture/moving picture is detected from at least one of the images, the camera module 116 determines that the shot person is a person in a picture/moving picture and not a live person. In contrast, in the case where the border line (outline) of a picture/moving picture is not detected from at least one of the images, the camera module 116 determines that the shot person is an actual person.

Third, the camera module 116 extracts a person region and a background region from the images shot at a plurality of magnifications, and identifies whether a contrast difference exists between the extracted person regions and background regions. Furthermore, the camera module 116 identifies whether or not a border line (outline) of a picture/moving picture is detected from at least one of obtained images. In the case where the contrast difference does not exist between the person regions and background regions and the border line (outline) of a picture/moving picture is detected from at least one of the images, the camera module 116 determines that the person is a person in a picture/moving picture. Furthermore, in the case where the contrast difference does not exist between the person regions and background regions and the border line (outline) of a picture/moving picture is not detected from at least one of the images, the camera module 116 determines that the person is an actual person. Also, the camera module 116 extracts person regions and background regions from images. In the case where a contrast difference exists between the extracted person regions and background regions, the camera module 116 determines that the person is an actual person.

In case of determining that an image of person shot using the above-described method is an actual person and not a picture of a picture, the camera module 116 extracts a person region (for example, a facial region) from at least one of the obtained images and applies a person (face) recognition related function to the extracted person region.

The application module 117 comprises a processor or subprocessor for operation and includes a browser, an electronic mail, an instant message, word processing, keyboard emulation, an address book, a touch list, a widget, Digital Right Management (DRM), voice recognition, voice duplication, position determining function, location based service, etc. The memory 110 may further include an additional module (machine executable code) besides the above-described modules.

Also, various functions of the electronic device 100 according to the present invention may be executed by one or more stream processings and/or hardware including an Application Specific Integrated Circuit (ASIC) and/or software and/or combination of these.

Figure 2:
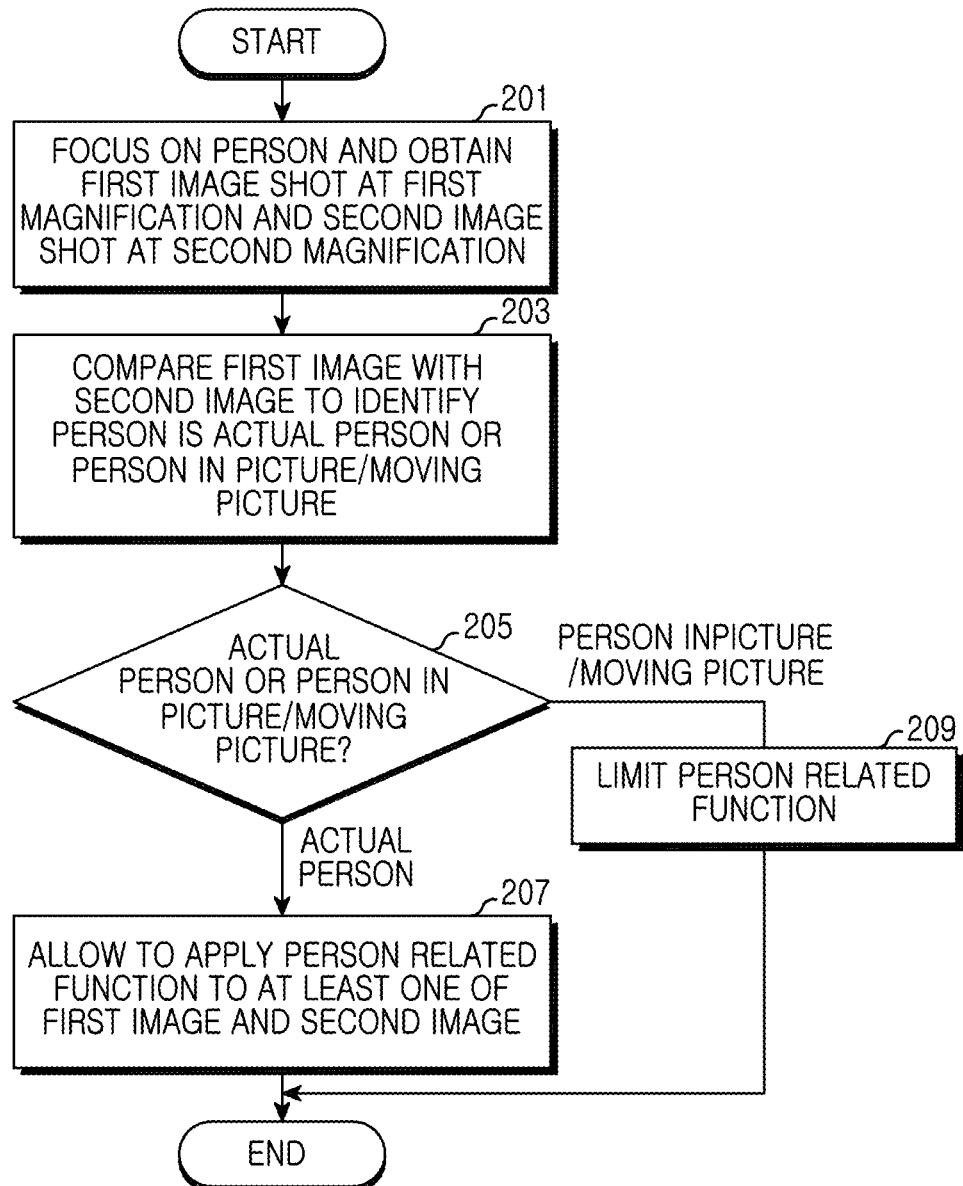
FIG. 2 is a flowchart illustrating a method for operating an electronic device according to an exemplary embodiment of the present invention.

FIG. 2 is a flowchart illustrating exemplary operation of a method for operating an electronic device according to an exemplary embodiment of the present invention.

Referring now to FIG. 2, the processor 122 (FIG. 1) executes the machine executable code of the camera module 116 and at least one other module. The processor 122 executes modules and controls the camera subsystem 193.

At step (201), the camera module 116 focuses on a person and obtains a first image captured at a first magnification, as well as a second image captured at a second magnification. Depending on the camera module 116, the camera subsystem 193 regulates configuration thereof. For example, in case of changing magnification, the camera subsystem 193 regulates an optical zoom to achieve the respective magnification levels. The camera module 116 may extract a captured image region of a specific person for recognition from the captured image. In the case where an image quality of the extracted region is poor, the camera module 116 may regulate a focus of the camera subsystem 193 for a "person region" in order to raise the image quality.

Next, at step (203), the camera module 116 compares the obtained first image with the obtained second image to identify whether or not the person is an actual person or a person in a picture/moving picture by extracting a person region and a background region excluding the person region from a first image, and derives a first comparison characteristic between the extracted person region and the extracted background region. A method thereof is described below with reference to the drawings. The first comparison characteristic may be at least one of contrast, a focal length, and sharpness. An artisan understands there are various ways of comparing contrast, focal length, and sharpness of an image.

After that, when determining that the shot (photographed) person is a person in a picture/moving picture in step 203, the camera module 116 enters step 209 to limit a person related function. In other words, any access that requires image-based identification would be limited because the image must be a live image actually within the presence of the electronic device, and not a photo in order to prevent fraud, identity theft, etc. This person related function may be face recognition, motion recognition, etc. In contrast, when determining that the person is not a person in a picture/moving picture, that is, the person is an actual person in step 203, the camera module 116 performs step 207 to apply the person related function to at least one of the first image and the second image.

Figure 3:
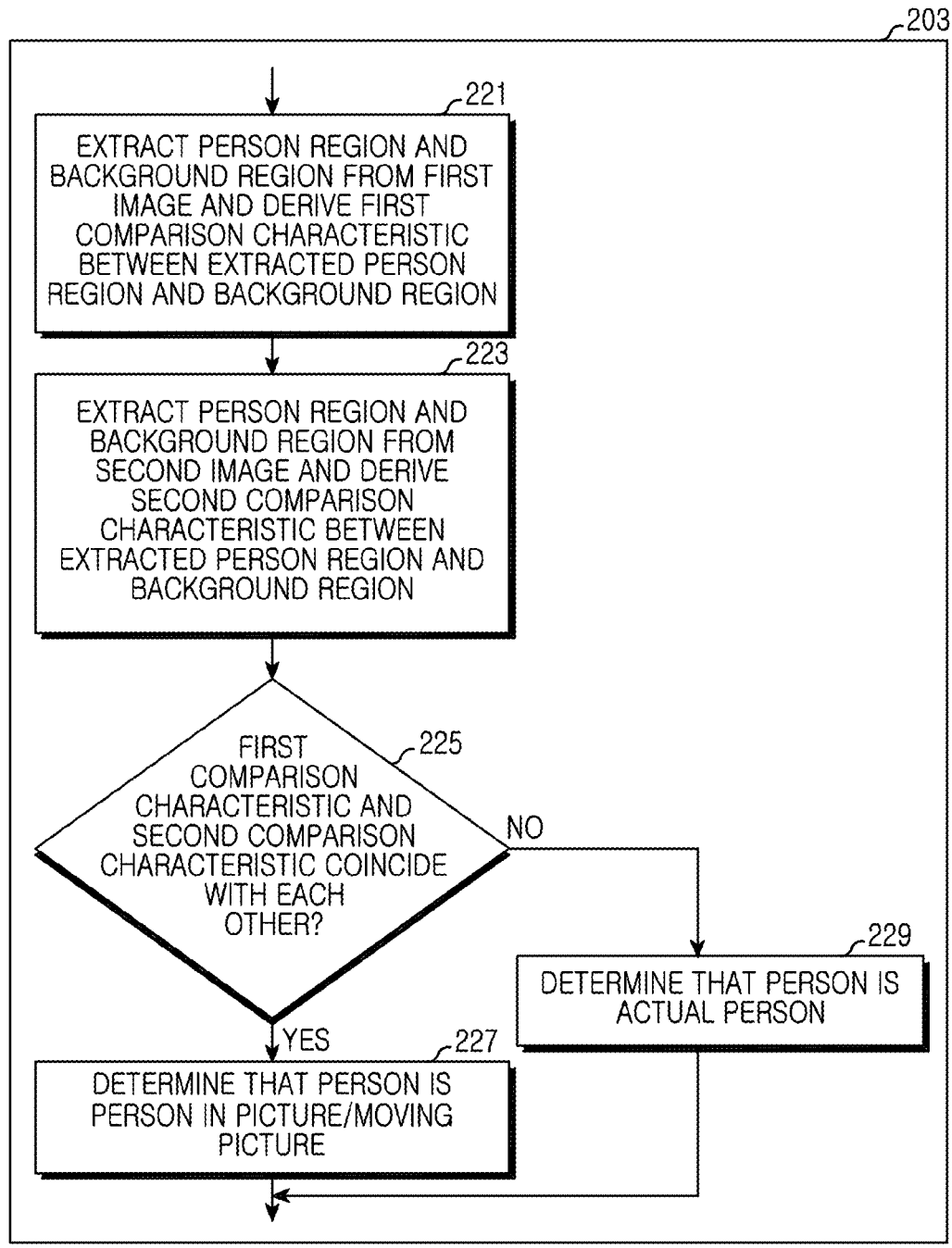
FIG. 3 is a flowchart illustrating step 203 of FIG. 2 identifying whether or not a person whose image has been captured is an actual person in front of (i.e. in the presence of) the camera or a photo of a person in a picture/moving picture according to an exemplary embodiment of the present invention.

FIG. 3 is a flowchart illustrating step 203 of FIG. 2 identifying whether a person shot from images is an actual person or a person in a picture/moving picture according to an exemplary embodiment of the present invention.

Referring now to FIG. 3, at step (221) the camera module 116 extracts a person region including the person, and a background region excluding the person region from a first image, and derives a first comparison characteristic between the extracted person region and the extracted background region.

At step 223, the camera module 116 extracts a person region and a background region excluding the person region from a second image and derives a second comparison characteristic between the extracted person region and the extracted background region.

The first comparison characteristic and the second comparison characteristic may be at least one of contrast, a focal length, and sharpness.

For example, when the first comparison characteristic and the second comparison characteristic comprises contrast, the contrast denotes a difference of a visual characteristic that enables a user to discriminate between a foreground (person region) and a background (background region), and may be calculated as a numerical value.

Moreover, in the case where a shot object is not focused, the contrast of a relevant region is low.

In contrast, in the case where a shot object is focused, the contrast of a relevant region is relatively high. In other words, a region where contrast is low is dim and a region where contrast is high is clear. Also, a method for extracting a person region and a background region excluding the person region from the first image and the second image can be practiced in various ways that are within the spirit and scope of the claimed invention.

For example, edge detecting may be used. Subsequently, at step (225), the camera module 116 determines whether the derived first comparison characteristic and the derived second comparison characteristic coincide with each other.

In the case where the first comparison characteristic and the second comparison characteristic coincide with each other, the camera module 116 performs step 227 to determine that the shot person is not an actual person. For example, in this case, the shot images may be a person in a picture/moving picture, and not an actual person. In contrast, in the case where the first comparison characteristic and the second comparison characteristic do not coincide with each other, the camera module 116 performs step 229 to determine that the shot person is an actual person.

Figure 4:
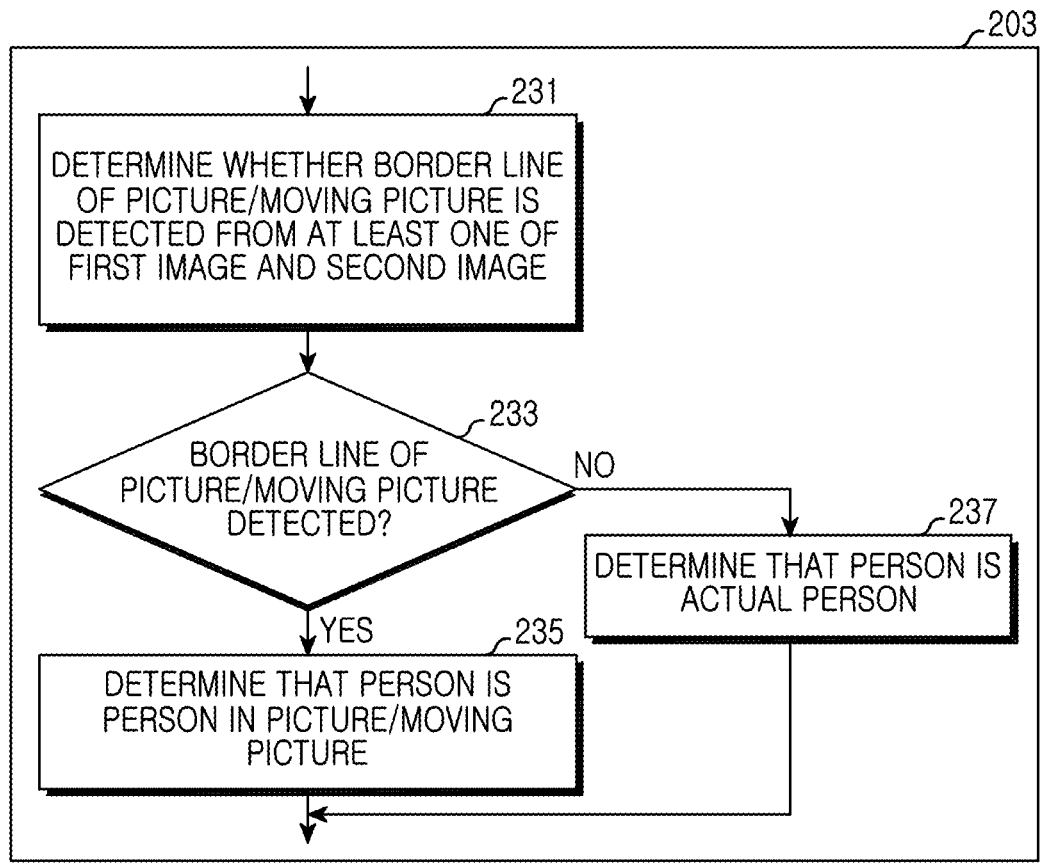
FIG. 4 is a flowchart illustrating step 203 of FIG. 2 identifying whether a person whose image has been captured is an actual person in front of the camera or a photo of a person in a picture/moving picture according to an exemplary embodiment of the present invention.

FIG. 4 is a flowchart illustrating more detail regarding step 203 of FIG. 2 that identifies whether or not a person shot from images is an actual person or a person in a picture/moving picture according to an exemplary embodiment of the present invention.

Referring now to FIG. 4, the camera module 116 determines whether a border line of a picture/moving picture is detected from at least one of the first image and the second image in step 231. A method for detecting a border line of a picture/moving picture from these images is various. For example, edge detecting may be used.

Subsequently at step (223), in the case where the border line of the picture/moving picture is detected, the camera module 116 performs step 235 to determine that the shot person is not an actual person but a person in a picture/moving picture. In contrast, when the border line of the picture/moving picture is not detected, the camera module 116 performs step 237 to determine that the shot person is an actual person.

Figure 5:
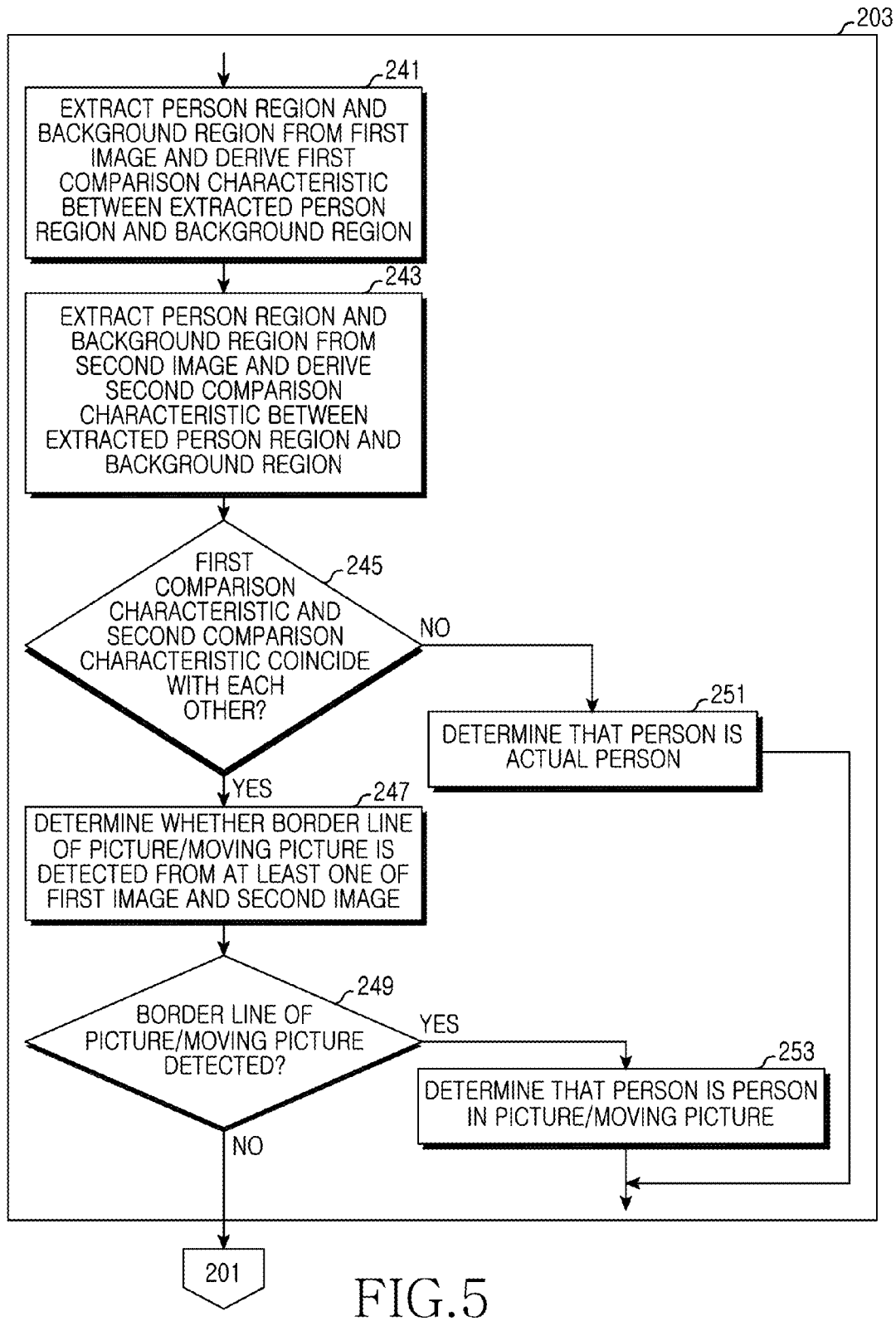
FIG. 5 is a flowchart illustrating step 203 of FIG. 2 identifying whether a person whose image has been captured is an actual person in front of the camera or a photo of a person in a picture/moving picture according to an exemplary embodiment of the present invention.

FIG. 5 is a flowchart illustrating more detail regarding step 203 of FIG. 2 identifying whether a person shot from images is an actual person or a person in a picture/moving picture according to another exemplary embodiment of the present invention. FIG. 5 illustrates an exemplary embodiment that combines the exemplary embodiment of FIG. 3 and the exemplary embodiment of FIG. 4, and follows the procedure below.

Referring now to FIG. 5, at step (241), the camera module 116 extracts a person region and a background region from the first image and derives a first comparison characteristic between the extracted person region and the extracted background region.

At step (243), the camera module 116 extracts a person region and a background region from the second image and derives a second comparison characteristic between the extracted person region and the extracted background region. The first comparison characteristic and the second comparison characteristic may be at least one of contrast, a focal length, and sharpness.

At step (245), the camera module 116 determines whether or not the derived first comparison characteristic and the derived second comparison characteristic coincide with each other.

At step (245), in the case where the first comparison characteristic and the second comparison characteristic do not coincide with each other, the camera module 116 proceeds to step 251 to determine that the shot person is an actual person.

In contrast, in the case at step (245) where the first comparison characteristic and the second comparison characteristic do coincide with each other, the camera module 116 then performs step 247 to determine whether or not a border line of a picture/moving picture is detected from at least one of the first image and the second image.

In the case at step (249) where the border line of the picture/moving picture is detected, the camera module 116 performs step 253 to determine that the shot person is a person in a picture/moving picture.

In contrast, in the case where the border line of the picture/moving picture is not detected in step 249, the camera module 116 re-performs step 201 of FIG. 2 again. For example, the camera module 116 changes a place and requests a user to re-perform the steps of FIG. 2 again, and puts off to determine whether the shot person is an actual person or a person in a picture/moving picture.

FIGS. 6A to 6D are views illustrating a method for operating an electronic device according to an exemplary embodiment of the present invention.

Figure 6A:
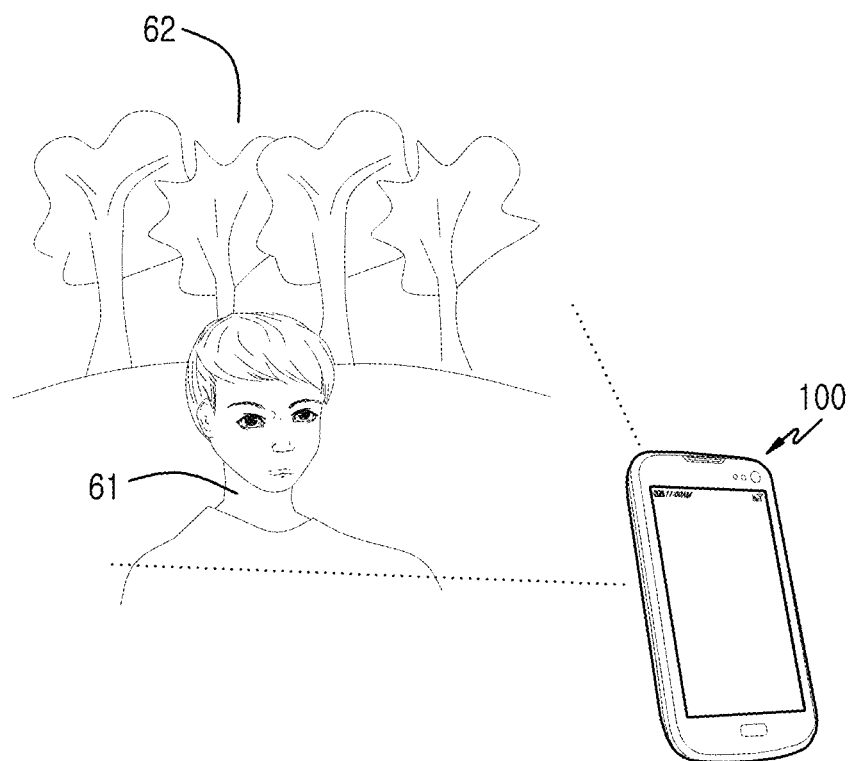
FIG. 6A, FIG. 6B, FIG. 6C and FIG. 6D are views illustrating exemplary operation of a method for operating an electronic device according to an exemplary embodiment of the present invention.
Figure 6B:
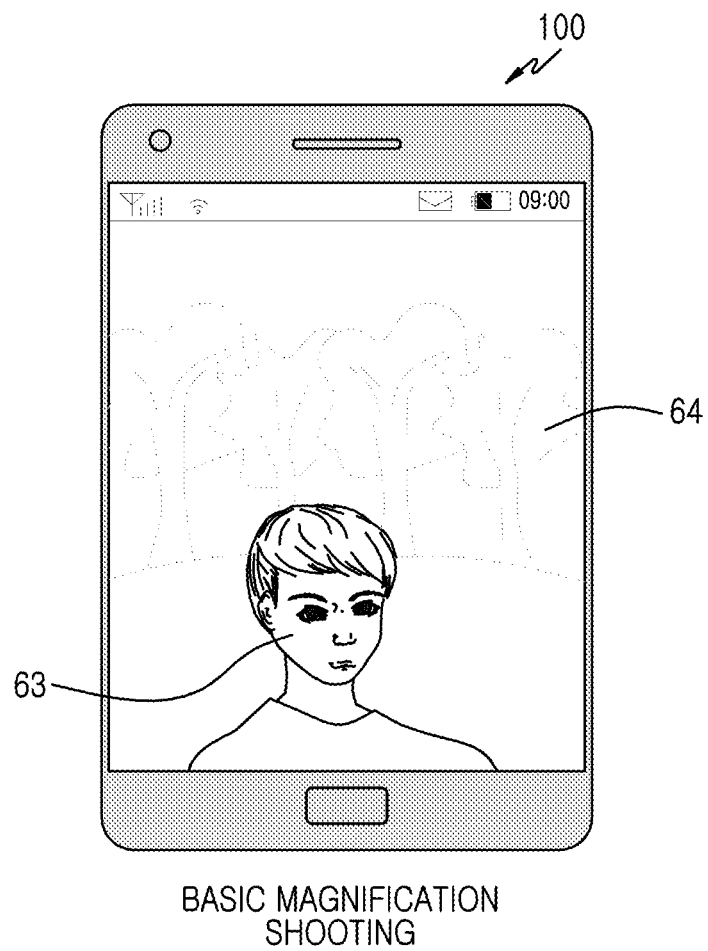
Figure 6C:
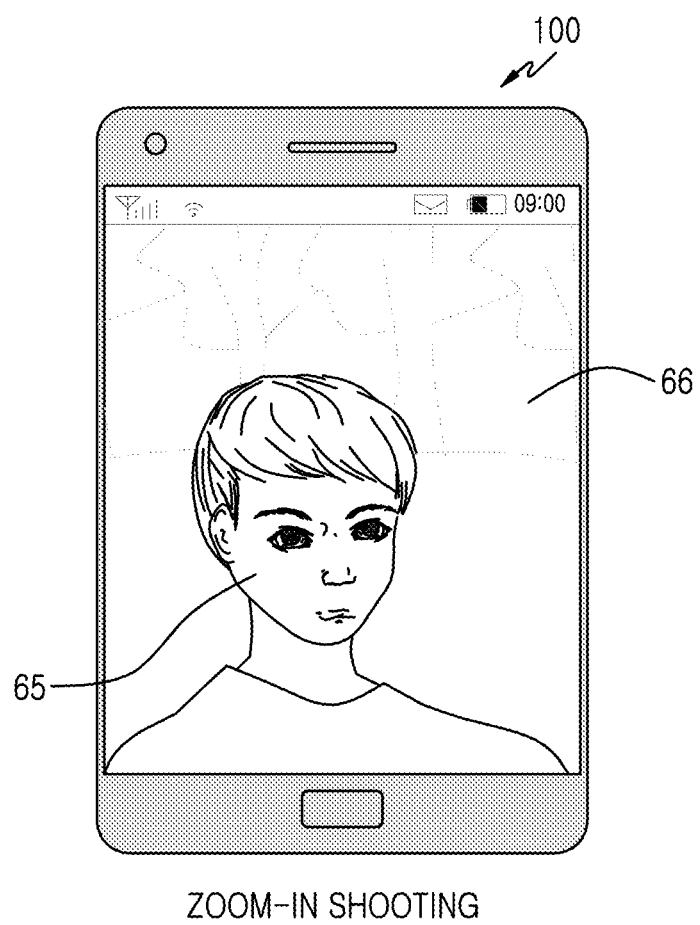
Figure 6D:
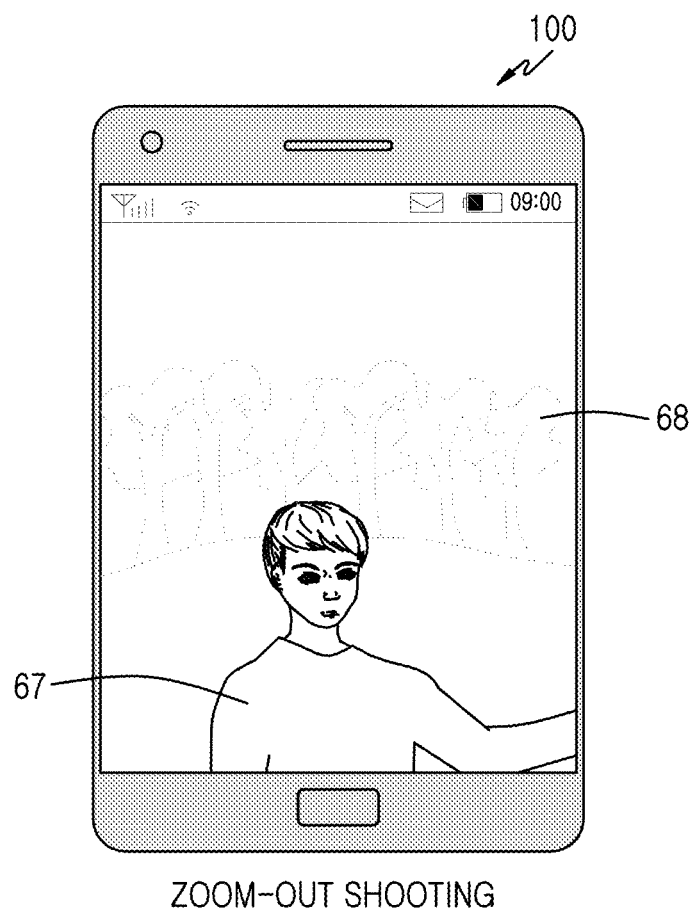

Referring now to FIG. 6A, the electronic device 100 focuses on an actual person 61 and obtains a first image shot at a first magnification and a second image shot at a second magnification. Referring to FIGS. 6B to 6D, the electronic device 100 focuses on the person 61 at a predetermined basic magnification to obtain a first image shot at the first magnification, and focuses on the person 61 at a magnification higher than the basic magnification (camera zoom-in) to perform shooting or focuses on the person 61 at a magnification lower than the basic magnification (camera zoom-out) to perform shooting to obtain a second image. Examination of the shot first image and the shot second image shows that a person region 63 (FIG. 6B) where the person 61 has been shot is clear but a background region 63 where a background 62 (FIG. 6A) positioned behind the person 61 has been shot is dim because even when a magnification changes, the person 61 is focused in response to the changed magnification and shooting is performed.

In other words, in the case where an actual person 61 and the background 62 are shot and the person 61 positioned at the foreground is focused and shot, a contrast difference between person regions 63, 65, 67 and background regions 64, 66, 68 discriminated in a shot image is generated. In the case where a contrast difference between the person region 63 and the background region 64 discriminated in a first image and a contrast difference between the person regions 65, 67 and the background regions 66, 68 discriminated in a second image do not coincide with each other, the electronic device 100 according to an embodiment of the present invention may determine that the shot person 61 is an actual person.

In contrast, in the case where a contrast difference between the person region 63 and the background region 64 discriminated in the first image and a contrast difference between the person regions 65, 67 and the background regions 66, 68 discriminated in the second image coincide with each other, the electronic device 100 may determine that the shot person 61 is a person in a picture/moving picture.

FIGS. 7A to 7D are views illustrating a method for operating an electronic device according to an exemplary embodiment of the present invention.

Figure 7A:
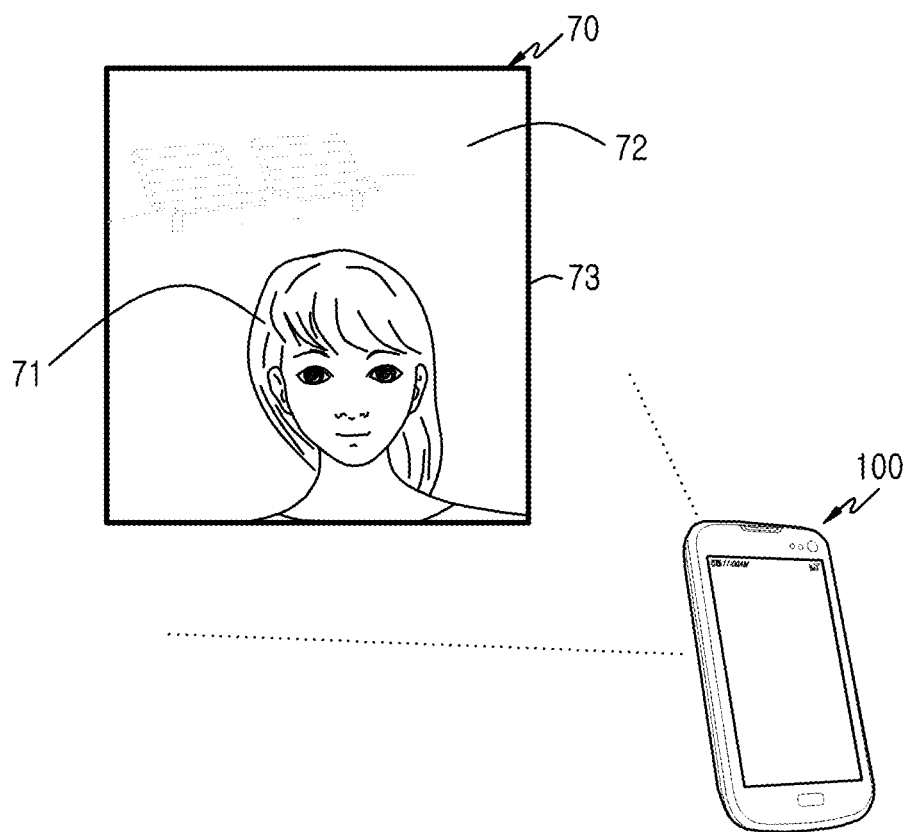
FIG. 7A, FIG. 7B, FIG. 7C and FIG. 7D are views illustrating exemplary operation of a method for operating an electronic device according to an exemplary embodiment of the present invention.
Figure 7B:
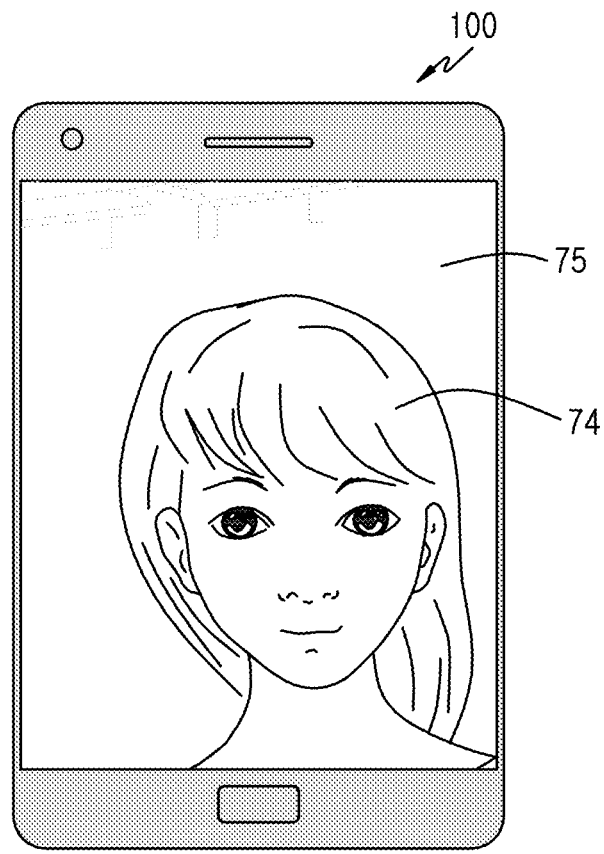
Figure 7C:
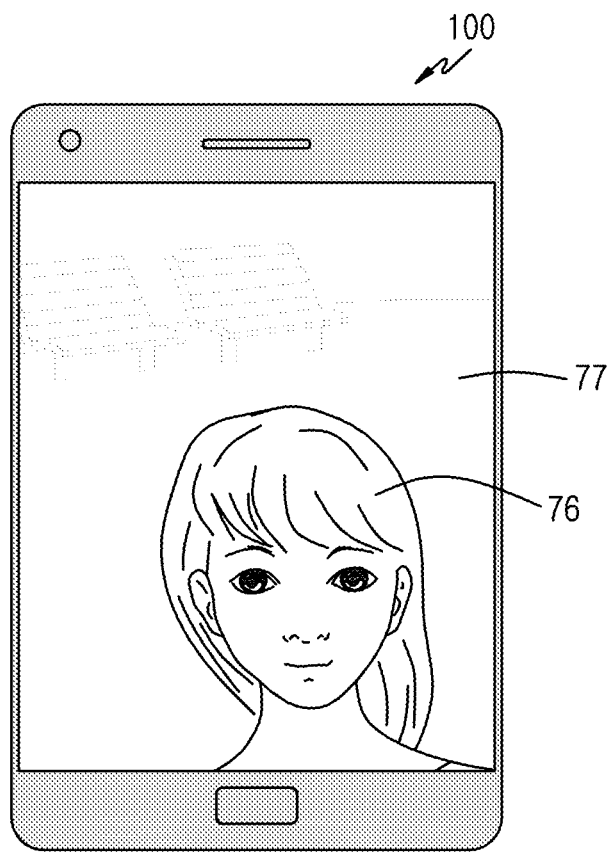

Referring now to FIG. 7A, the electronic device 100 takes a picture 70 in which a person 71 and a background 72 have been photographed. It is assumed that the person 71 in the picture 70 is clearer than the background 72. The electronic device 100 focuses on the person 71 in the picture 70 to obtain a first image shot at a first magnification and a second image shot at a second magnification. Referring to FIGS. 7B and 7C, the electronic device 100 focuses on the person 71 in the picture 70 and performs shooting at a first magnification (camera zoom-in) higher than a predetermined basic magnification to obtain a first image, and focuses on the person 71 in the picture 70 and performs shooting at a magnification (camera zoom-out) lower than the basic magnification to obtain a second image. Examination of the shot first image and the shot second image shows that person regions 74, 76 where the person 71 in the picture 70 has been shot are clear but background regions 75, 77 where the background 72 in the picture 70 has been shot are dim. However, the contrast of the person regions 74, 76 and the background regions 75, 77 is constant because even when the person 71 in the picture 70 is focused, the background 72 in the picture 70 is also focused.

Figure 7D:
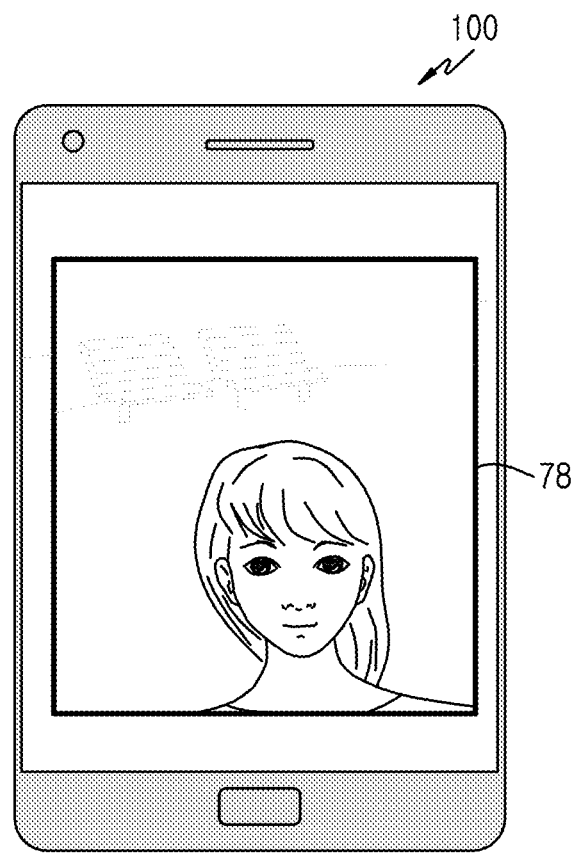

Furthermore, referring to FIG. 7D, since the picture 70 has a border line (outline), in case of shooting the picture 70 at an even lower magnification (zoom-out), the electronic device 100 obtains an image where the background behind the picture 70 as well as the picture 70 is shot. In this case, the electronic device 100 detects a region 78 where a border line 73 of the picture 70 has been shot and determines that the shot person 71 is a person in the picture.

Methods according to exemplary embodiments described in claims and/or specification of the present invention may be implemented in the form of software that configures hardware such as a microprocessor, processor, sub-processor, controller, etc., hardware, or a combination of these.

In case of implementation in the form of software configured hardware, a computer readable storage medium storing one or more programs (software modules) may be provided. The one or more programs stored in the computer readable storage medium are configured for execution by one or more processors inside the electronic device. The one or more programs include instructions for allowing the electronic device to execute methods according to the embodiments described in claims and/or specification of the present invention.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that under the broadest reasonable interpretation, a "processor" or "microprocessor" as well as "unit" constitute statutory subject matter comprising hardware in compliance with 35 U.S.C.§101.

These programs (software modules, software) may be stored in a random access memory, a non-volatile memory including a flash memory, Read Only Memory (ROM), an Electrically Erasable Programmable Read Only Memory (EEPROM), a magnetic disc storage device, a Compact Disc (CD)-ROM, Digital Versatile Discs (DVDs) or other types of optical storage devices, and a magnetic cassette. Alternatively, these programs may be stored in a memory configured in a combination of some or all of these. Also, a plurality of respective memories may be provided.

Also, these programs may be stored in an attachable storage device that can access the electronic device via a communication network such as the Internet, Intranet, Local Area Network (LAN), Wide LAN (WLAN), and a Storage Area Network (SAN), or a communication network configured in combination of these. This storage device may access the electronic device via an external port.

Also, a separate storage device on a communication network may access a portable electronic device.

It is also within the spirit and scope of the claimed invention that a camera subsystem recording images of the object may be a separate entity from the process unit, and could, for example, communicate with the processing unit via wireless communication, or IP, etc. While the examples have used an electronic device that is typically portable, the invention is broad and the processing unit could be part of a security server and a portable electronic device with a camera module is attempting to purchase or access something requiring identification of the person seeking purchase or access.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described exemplary embodiments but should be determined by not only the appended claims but also the equivalents thereof.

Since the present invention can clearly identify whether an object that is being shot by a camera is an actual object or an object in a picture/moving picture, safe security setting using this is possible.

What is claimed is:

1. A method comprising:
    obtaining, at an electronic device, at least a first image and a second image for one or more objects;
    identifying, from the first image, a first object region corresponding to at least one object of the one or more objects and a first background region;
    identifying from the second image a second object region corresponding to the at least one object of the one or more objects and a second background region;
    determining a first comparison characteristic corresponding to the first object region and the first background region, and a second comparison characteristic corresponding to the second object region and the second background region; and
    presenting, via a display operatively coupled with the electronic device, an indication as to whether the at least one object is a real object based at least in part on the first comparison characteristic and the second comparison characteristic.

2. The method of claim 1, wherein the at least one object comprises a person, an animal, or a thing.

3. The method of claim 1, wherein the identifying comprises:
    recognizing one or more facial features from the at least one object.

4. The method of claim 3, wherein the recognizing comprises:
    analyzing a characteristic of a face, a hair, an eye, a facial muscle, or any combination thereof.

5. The method of claim 1,
    wherein the first comparison characteristic is determined based on at least one of contrast, a focal length, sharpness of the first image and any combination thereof.

6. The method of claim 1, wherein the presenting comprises:
    determining that the at least one object is a photo based at least in part on a determination that the first comparison characteristic and the second comparison characteristic coincide with each other.

7. The method of claim 1, wherein the presenting comprises:
    determining that the at least one object is the real object based at least in part on a determination that the first comparison characteristic and the second comparison characteristic do not coincide with each other.

8. The method of claim 1, wherein the presenting comprises:
    determining that the at least one object is a photo based at least in part on a determination that a specified outline is identified from the at least one object.

9. The method of claim 1, further comprising:
    performing a specified function based at least in part on a determination that the at least one object is the real object.

10. The method of claim 9, wherein the specified function comprises a face recognition function or a motion recognition function.

11. An apparatus comprising:
a camera module; and
a controller operatively coupled with the camera module, the controller configured to:
obtain, via the camera module, at least a first image and a second image including at least one object;
identify, from the first image, a first object region corresponding to the at least one object and a first background region;
identify, from the second image, a second object region corresponding to the at least one object, and a second background region;
determine a first comparison characteristic corresponding to the first object region, and a second comparison characteristic corresponding to the second object region; and
present, via a display operatively coupled with the controller, an indication as to whether the at least one object is a real object based at least in part on the first comparison characteristic and the second comparison characteristic.

12. The apparatus of claim 11, wherein the controller is configured to: recognize one or more facial features from the at least one object.

13. The apparatus of claim 11, wherein the controller is configured to: analyze a characteristic of a face, a hair, an eye, a facial muscle, or any combination thereof.

14. The apparatus of claim 11, wherein the first comparison characteristic and the second comparison characteristic are determined based on at least one of contrast, a focal length, sharpness of the image and any combination thereof.

15. The apparatus of claim 11, wherein the controller is configured to: determine that the at least one object is a photo based at least in part on a determination that the first comparison characteristic and the second comparison characteristic coincide with each other.

16. The apparatus of claim 11, wherein the controller is configured to: determine that the at least one object is the real object based at least in part on a determination that the first comparison characteristic and the second comparison characteristic do not coincide with each other.

17. The apparatus of claim 11, wherein the controller is configured to:
determine that the at least one object is a photo based at least in part on a determination that a specified outline is identified from the at least one object.

18. The apparatus of claim 11, wherein the controller is configured to: perform at least one of a face recognition function or a motion recognition function based at least in part on a determination that the at least one object is the real object.

19. A non-transitory machine-readable storage device storing instructions that, when executed by one or more processors, cause the one or more processors to perform operations comprising:
obtaining, at an electronic device, a first image and a second image for one or more objects including a at least one object of the one or more objects;
identifying, from the first image, a first object region corresponding to the at least one object and a first background region;
identifying from the second image, a second object region corresponding to the at least one object and a second background region;
determining a first comparison characteristic corresponding to the first object region and the first background region, and determining a second comparison characteristic corresponding to the second object region and the second background region, in which the first comparison characteristic and the second comparison characteristic are expressed as numerical values; and
presenting, via a display operatively coupled with the electronic device, an indication as to whether the at least one object is a real object based at least in part on the first and second comparison characteristics.

* * * * *